R. I. Draughon,
Cultivator
No. 96,562.  Patented Nov. 9, 1869.
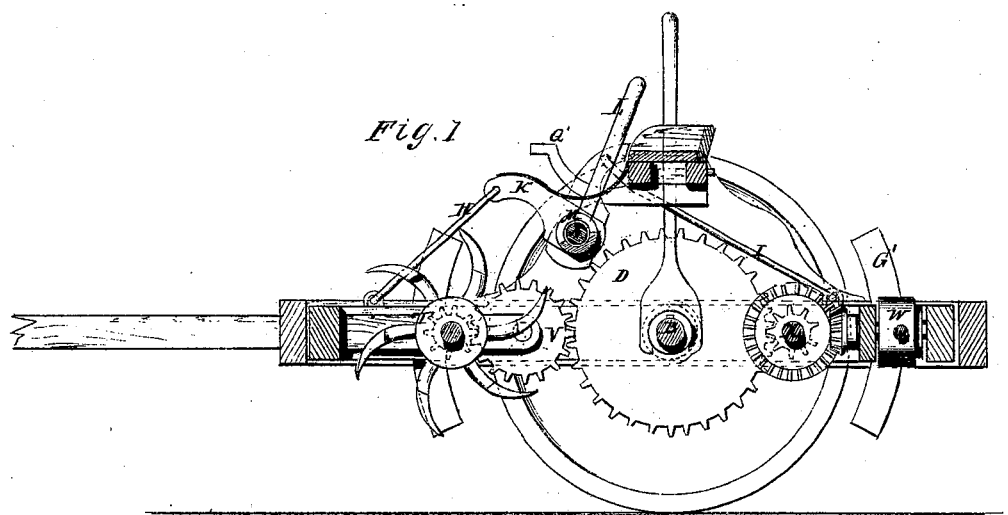
Fig. 1
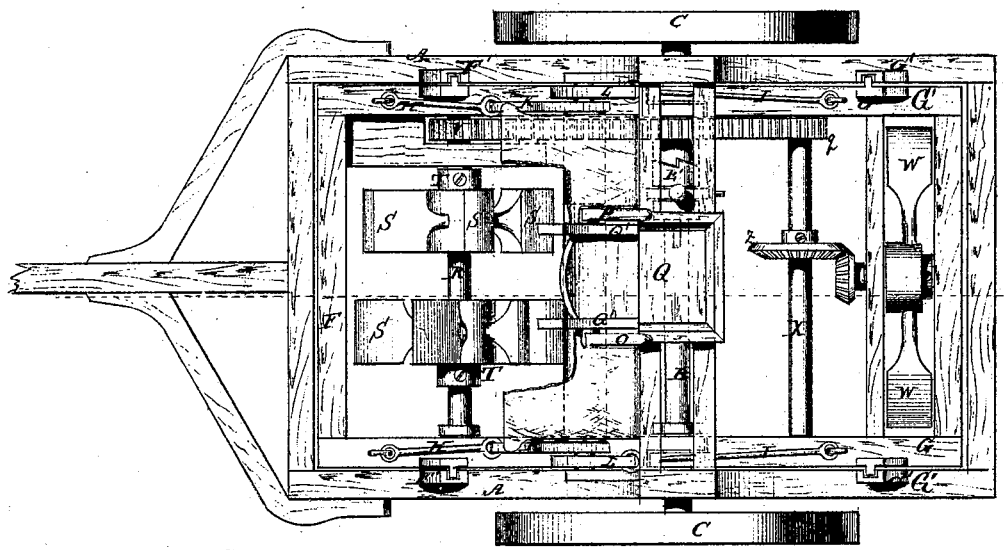
Witnesses:
Alex F. Roberts
Frank Blockley
Inventor:
R. I. Draughon
Per Munn & Co.
Attorneys.

UNITED STATES PATENT OFFICE.

ROBERT I. DRAUGHON, OF CLAIBORNE, ALABAMA.

IMPROVEMENT IN COTTON-CULTIVATORS.

Specification forming part of Letters Patent No. 96,562, dated November 9, 1869.

*To all whom it may concern:*

Be it known that I, R. I. DRAUGHON, of Claiborne, in the county of Monroe and State of Alabama, have invented a new and Improved Cotton-Cultivator; and I do hereby declare that the following is a full, clear, and exact description thereof, which will enable those skilled in the art to make and use the same, reference being had to the accompanying drawings, forming a part of this specification.

The object of this invention is to provide a simple and efficient machine for simultaneously cultivating on both sides of the row and chopping or thinning out the plants transversely thereof.

The improvement consists of a pair of rotary cutters for working on each side of the row, and another rotary cutter for working transversely thereto, for chopping out the plants at intervals, the said rotary cutters being suspended from a frame on two wheels by vibrating supporting-frames, having means for raising or lowering them as required, and deriving rotary motion from the axle of the said two wheels, all as hereinafter more fully specified.

Figure 1 represents a longitudinal section of my improved machine, and Fig. 2 represents a plan view of the same.

Similar letters of reference indicate corresponding parts.

A represents a main frame, supported on the axle B, of the pair of wheels C, connected thereto, so as to impart rotary motion to it. The tongue for hitching the animals to is connected to this frame.

D represents a large spur driving-wheel on the said shaft, arranged to be set in motion by a clutch, E, or to run loose when unclutched.

F and G represent frames for supporting the rotary cutters. They are suspended at one end on the axle B, and at the other ends by connecting-rods H I, from arms K L, projecting from shafts M N, the shaft M being hollow and the shaft N working in it. These shafts have lever-handles O P rising up, one at each side of the seat Q, or arms Q', projecting therefrom and provided with spring-catches for taking into notches in the said sides or arms, to hold them in any required position for governing the height of the rotary cutters supported on these oscillating frames, the one projecting forward of the shaft B and the other behind it. Both frames work in curved guides, F' G', on the frame A. The frame F carries a transverse shaft, R, on which are mounted two sets of curved cutter-blades, S, having round shanks or arms taking into round holes in the hubs T, where they are secured by set-screws or other means, each independently of the others, so that any one may be readily removed for the substitution of others when worn out or broken, and so that the blades may be turned to set at any angle, either for throwing the earth to or from the row or directly behind. These cutters are so placed upon the shaft that when the machine is drawn with the center above the row they will work on both sides. They are rotated by a gear-wheel, V, in connection with the wheel D, and so calculated as to impart sufficient speed to the said cutters to cause them to cut over the whole surface of the ground over which they pass. The depth of the cutting may be regulated by the proper adjustment of the lever O and shaft M. The rear oscillating frame is provided with one set of cutters of similar construction and arrangement, except that the axis is ranged in the longitudinal direction of the machine, so that the cutters work transversely of the row for chopping or thinning out some of the plants. These cutters W are worked by a transverse shaft, X, having a wheel, q, gearing with the driving-wheel D, and provided with a bevel-wheel, Z, gearing with a corresponding wheel on the axis of the said cutters. The motion of these cutters is designed to be slow, so as to cut only at intervals, for removing a part of the plants and leaving such a quantity as is required to grow. The frame of this set of cutters is also adjusted as to height to regulate the depth of cutting, the same being effected by the hand-lever P and shaft N.

Having thus described my invention, what I claim as new, and desire to secure by Letters Patent, is—

1. The combination, with the frame A and wheels C, of the oscillating frame F, the two sets of rotary cutters S, adjusting-shaft M, arms K L, connecting-rods H I, and adjusting-catches, substantially as specified.

2. The combination, with the frame A and wheels C, of the oscillating frame G, rotary cutters W, arranged to work across the rows, the adjusting-shaft N, arms, and connecting-rods, substantially as specified.

3. The combination on one frame, A, and wheel C of the two sets of cutters S, and the one set, W, when arranged on oscillating or adjustable supports, and to act upon both sides of the row, and transversely thereof, substantially as specified.

ROBT. I. DRAUGHON.

Witnesses:
N. A. AGEE,
W. R. AGEE, Jr.